United States Patent [19]
Lozykowski et al.

[11] Patent Number: 6,140,669
[45] Date of Patent: Oct. 31, 2000

[54] GALLIUM NITRIDE DOPED WITH RARE EARTH IONS AND METHOD AND STRUCTURE FOR ACHIEVING VISIBLE LIGHT EMISSION

[75] Inventors: Henryk J. Lozykowski; W. M. Jadwisienczak, both of Athens, Ohio

[73] Assignee: Ohio University, Athens, Ohio

[21] Appl. No.: 09/253,170

[22] Filed: Feb. 20, 1999

[51] Int. Cl.$^7$ ............................................... H01L 33/00
[52] U.S. Cl. ........................................................ 257/103
[58] Field of Search .............................. 257/103; 313/486

[56] References Cited

U.S. PATENT DOCUMENTS

| | | | |
|---|---|---|---|
| 5,504,767 | 4/1996 | Jamison et al. | 372/41 |
| 5,707,747 | 1/1998 | Tomiyama et al. | 428/457 |
| 5,716,450 | 2/1998 | Togawa et al. | 117/101 |
| 5,796,771 | 8/1998 | DenBaars et al. | 372/75 |
| 5,812,573 | 9/1998 | Shiomi et al. | 372/44 |
| 5,998,925 | 12/1999 | Shimizu et al. | 313/503 |
| 6,069,440 | 5/2000 | Shimizu et al. . | |

OTHER PUBLICATIONS

Lozykowski, H. J. et al., Cathodoluminescence of GaN doped with Sm and Ho, 1999, pp. 1–3.
Lozykowski, H. J., New Step Impact Electroluminescent Devices, 66:7, 1988, pp. 755–759.
Zavada et al., *Workshop on New Concepts on 3–D Optical Devices Using Rare Earths and Other Novel Approaches*, Apr. 15–17, 1998, pp. 1–20.
Nakamura, et al., *The Blue Laser Diode*, 1997, pp. 1–20 & 313–333.
Lozykowski, Proc. SPIE, vol. 836, 88, 1987.
Steckl, et al., Visible Emission from Er–doped GaN Grown by Solid Source Molecular Beam Epitaxy, 73:12, 1998, pp. 1–7.
Steckl, et al., Room–temperature visible and infrared photoluminescence from Pr–implanted GaN films by focused–ion–beam direct write, 74:16, 1999, pp. 2364–2366.
Birkhahn, et al., Red Light emission by photoluminescence and electroluminescence from Pr–doped GaN on Si substrates, 74:15, 1999, pp. 2161–2163.
Lozykowski, Novel Step Impact Electroluminescent Devices, vol. 38, 1989, pp. 60–63.
Lozykowski et al., Visible cathodoluminescence of GaN doped with Dy, Er, and Tm, 74:8, 1999, pp. 1129–1131.
Shionoya S. et al., *Electroluminescence Proceedings of the Fourth International Workshop*, Oct. 11–14, 1988, pp. 60, 62, 64.

*Primary Examiner*—Stephen D. Meier
*Attorney, Agent, or Firm*—Standley & Gilcrest LLP

[57] ABSTRACT

The present invention is a GaN semiconductor crystal that is doped with at least one RE ion, wherein the structure has been annealed at a temperature of at least about 1,000 degrees Celsius. As a result, the structure of structure is preferably adapted to provide a luminescence spectra over the range from about 380 nanometers to about 1000 nanometers when excited by a suitable excitation. The present invention also includes apparatus and methods for producing cathodoluminesence and electroluminesence that may be suitable for use in any of a wide variety of optoelectronic devices.

21 Claims, 7 Drawing Sheets

GALLIUM NITRIDE DOPED WITH RARE EARTH IONS AND METHOD AND STRUCTURE FOR ACHIEVING VISIBLE LIGHT EMISSION

BACKGROUND OF THE INVENTION

The present invention relates generally to rare earth (RE) doped gallium nitride (GaN), and more particularly, to the luminescence of gallium nitride doped with RE ions. In recent years, RE doped semiconductors have been of considerable interest for possible application in light emitting devices and for their unique optical and electrical properties. The RE luminescence depends very little on the nature of the host and the ambient temperature. The GaN and AlN semiconductors doped with Er and co-doped with O have been the most extensively studied. However, the doping of GaN and AlN with Er and O by molecular beam epitaxy (MBE) and metal organic chemical vapor deposition (MOCVD) both during epitaxial growth and post growth by ion implantation exhibits only infrared emissions at 1.54 $\mu$m. In addition, only infrared photoluminescence (PL) spectra have been achieved from GaN implanted with Nd and Er without oxygen co-doping.

Recently, two green emission lines at 537 nm and 558 nm were obtained from Er doped GaN grown by solid source MBE on a sapphire substrate. In addition, that experiment achieved a broad peak of low intensity blue emission between 480 nm and 510 nm. However, the blue emission has little practical utility due to its low intensity. Moreover, the experiment was unable to achieve luminescence spectra over the range from about 380 nm to about 1000 nm.

In light of the shortcomings of known technology relating to RE doped GaN, a need exists for an improved RE doped GaN structure that has increased industrial applicability. In particular, a need exists for a RE doped GaN structure that is suitable as a material for visible optoelectronic devices. A need also exists for a method of manufacturing a RE doped GaN structure that is suitable as a material for visible optoelectronic devices.

SUMMARY OF THE INVENTION

The present invention satisfies one or more of the aforementioned needs. A preferred embodiment of the structure of the present invention includes a GaN semiconductor crystal that is doped with at least one RE ion, wherein the structure has been annealed at a temperature of at least about 1,000 degrees Celsius. As a result, the structure of structure is preferably adapted to provide a luminescence spectra over the range from about 380 nanometers to about 1000 nanometers when excited by a suitable excitation.

The GaN may be grown by MBE, MOCVD, or by any other conventional technique. For example, the GaN may be grown on a sapphire substrate. The GaN may be n-type undoped prior to being doped with the RE ion(s). In an alternative embodiment of the present invention, the GaN may be doped with silicon as well as RE ion(s).

In one embodiment of the structure, the GaN is doped with the RE ion(s) during its growth process. Alternatively, the RE ion(s) may be implanted in the GaN using ion implantation techniques that are well known to those of ordinary skill in the art. For one example of doping, the GaN semiconductor crystal is doped with a beam of RE ions that are inclined at about 10 degrees to the normal of the epilayers of the GaN semiconductor crystal.

The annealing of the GaN semiconductor crystal is preferably performed under a flow of $N_2$ or $NH_3$. The annealing of the GaN semiconductor crystal preferably repairs any damage which may have been caused by the doping of RE ion(s). For example, the annealing preferably repairs damage to the GaN semiconductor crystal that is caused by the implantation of the RE ion(s). In addition, the annealing preferably incorporates the RE ion(s) as an optically active center.

Utilizing a preferred method and structure of the present invention, the Applicant has observed visible cathodoluminescence of the rare earth Dy, Er and Tm implanted in GaN. The implanted samples were given isochronal thermal annealing treatments at a temperature of 1100° C. in $N_2$ or $NH_3$, at atmospheric pressure to recover implantation damages and activated the rare earth ions. The sharp characteristic emission lines corresponding to $Dy^{3+}$, $Er^{3+}$, and $Tm^{3+}$ intra-$4f^n$-shell transitions, are resolved in the spectral range from 380 nm to 1000 nm, and are observed over the temperature range of 8.5 K–411 K. The cathodoluminescence emission is only weakly temperature dependent. The results indicate that rare earth-doped GaN epilayers of the present invention are suitable as a material for visible optoelectronic devices.

The present invention also includes apparatus and methods for producing cathodoluminesence and electroluminesence that may be suitable for use in any of a wide variety of optoelectronic devices.

In general terms, the method of producing cathodoluminesence comprises: (a) obtaining a gallium nitride crystal, the gallium nitride crystal having a dopant of at least one rare earth ion; wherein the structure has been annealed at a temperature of at least about 1,000 degrees Celsius; and (b) exciting the gallium nitride crystal with an electron beam so as to cause the crystal to produce cathodoluminesence.

In general terms the method of producing electroluminesence comprises: (a) obtaining a gallium nitride semiconductor crystal, the gallium nitride semiconductor crystal having a dopant of at least one rare earth ion; wherein the structure has been annealed at a temperature of at least about 1,000 degrees Celsius; and (b) placing the gallium nitride semiconductor crystal in an electric field of sufficient strength so as to cause the gallium nitride semiconductor crystal to produce electroluminesence.

The present invention also includes devices, such as optoelectronic devices (e.g., lasers and light-emitting diodes), for producing cathodoluminesence and electroluminesence using the structures and methods disclosed herein.

The devices and methods of the present invention may be produced using manufacturing techniques, mechanical and electronic arrangements and application protocols, otherwise known and used in the art.

The Applicants have also observed visible cathodoluminescence of the rare earth Sm and Ho implanted in GaN utilized a preferred method and structure of the present invention. The implanted samples were given isochronal thermal annealing treatments at a temperature of 1100° C. in $N_2$ or $NH_3$, at atmospheric pressure to recover implantation damages and activated the rare earth ions. The sharp characteristic emission lines corresponding to $Sm^{3+}$ and $Ho^{3+}$ intra-$4f^n$-shell transitions are resolved in the spectral range from 400 nm to 1000 nm, and observed over the temperature range of 11 K–411 K. The cathodoluminescent emission is only weakly temperature dependent. The results again indicate that rare earth doped GaN epilayers of the present invention are suitable as a material for visible optoelectronic devices.

The Applicant has also observed similar results with Nd doped GaN of the present invention. Furthermore, it should be recognized that all other rare earth ions might be utilized in the present invention. In addition to the novel features and advantages mentioned above, other objects and advantages of the present invention might become apparent from the following descriptions of the drawings and preferred embodiments.

DETAILED DESCRIPTION OF PREFERRED EMBODIMENT(S)

The present invention is directed to a method and structure for achieving visible light emission comprising GaN doped with RE ion(s).

The Applicants have observed cathodoluminescence (CL) of GaN implanted with Dy, Er and Tm. Richly structured luminescence spectra attributed to implanted RE ions are resolved over the wide spectral range from 380 nm to 1000 nm. The cathodoluminescence is strong over the temperature range from 9 K to 411 K.

Figure 1:
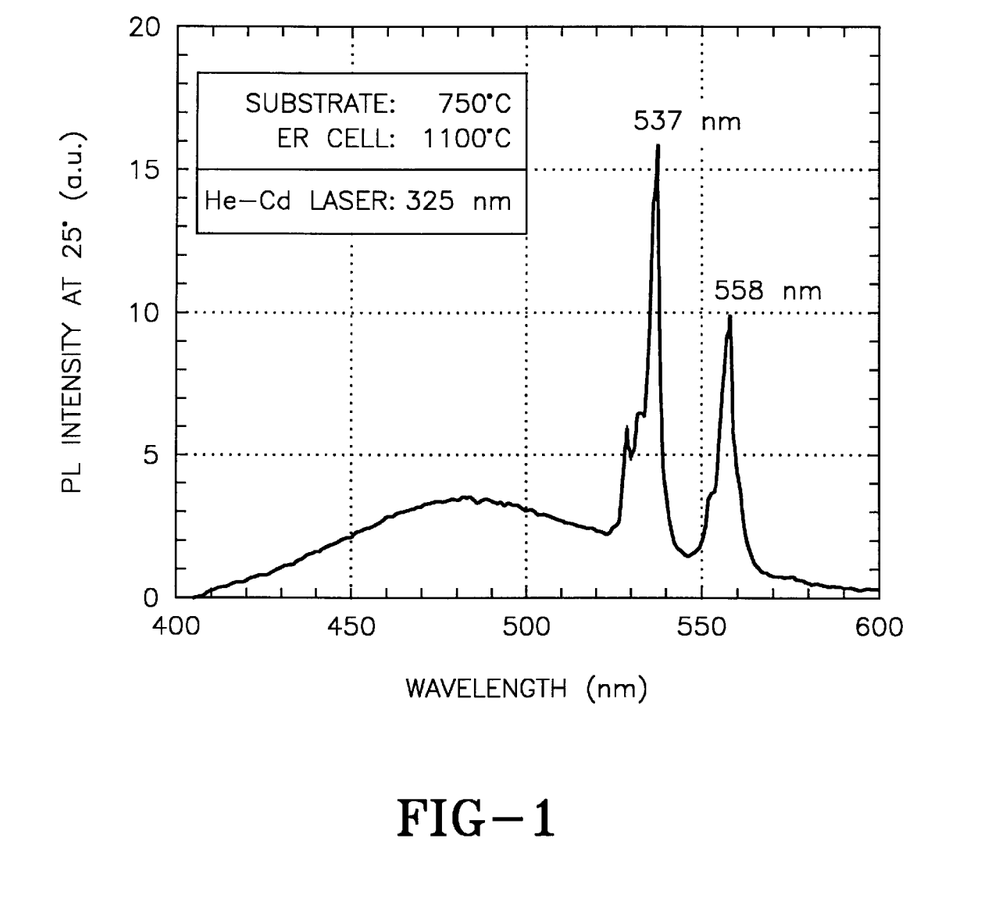
FIG. 1 is a graph of the luminescence spectra of a known Er doped GaN structure.

This is in contrast to the results obtained by Steckl and Birkhahn shown in FIG. 1, which showed only low intensity blue emission and two green emissions.

The GaN material used for this investigation was grown by MOCVD on the basal plane of 2-inch diameter sapphire substrates by EMCORE and CREE. The GaN was high quality n-type undoped and silicon doped epilayers implanted at room temperature with Dy, Er and Tm ions under the conditions shown in Table I which also provided the thicknesses of the GaN layers and electron concentrations. The implanting ion beam was inclined at 10° to the normal of the GaN epilayers to prevent channeling. The simulated depth profiles, the projected ranges and peak concentration were calculated using the Pearson distribution (see Table I). The thulium was implanted at three energies at fluences chosen to give an approximation of a square implant profile in the GaN epilayer. This sample was given isochronal thermal annealing treatments (duration 30 min) at temperatures from 650 up to 1150° C., in a tube furnace under the flow of $N_2$ or $NH_3$, (purity 99.999) at atmospheric pressure with flow rates of 120 cc/min using the proximity cap method to recover implantation damages and incorporate the RE ions as the luminescent center. The presence of GaN epilayers after post implantation annealing of the samples was confirmed by measuring x-ray diffraction (XRD) spectra. Samples annealed at temperatures ranging from 650° C. to 900° C. showed no luminescence related to the implanted impurity, while those annealed at 1000° C. showed only a weak signal, which indicates that temperature treatment below 1000° C. is too low to incorporate the RE ions as the optically active center and recover implantation damages. Only samples annealed above 1000° C. have strong visible CL spectra.

TABLE I

Summary of GaN sample and implantation parameters.

| Sample implanted by ion | Initial electron concentration [$10^{16}$ cm$^{-3}$] | Thickness of film [μm] | Implanted ion energy [keV] | Doses of implanted ions [$10^{13}$ ions/cm$^2$] | Projected range [nm] | Calculated peak concentration [$10^{19}$ cm$^{-3}$] |
|---|---|---|---|---|---|---|
| GaN: Dy | 5 | 1.4 | 150 | 100 | 19.1 | 3.3 |
| GaN: Si: Dy | 50 | 2.0 | 150 | 100 | 19.1 | 3.3 |
| GaN: Er | 5 | 1.4 | 150 | 100 | 19.8 | 3.2 |
| GaN: Si: Er | 50 | 2.0 | 150 | 100 | 19.8 | 3.2 |
|  |  |  | 150 | 10 |  |  |
| GaN: Tm | 0.5 | 2.25 | 47 | 2.8 | ~28 | 3.9 |
|  |  |  | 17 | 1.5 |  |  |

The cathodoluminescence was excited by an electron beam incident upon the sample at a 45° angel from an electron gun (Electroscan EG5 VSW) which was in a common vacuum (of ~$5 \times 10^{-7}$ torr) with the cryostat. The emitted light was collected by a quartz lens on the entrance slit of the spectrograph-monochromator (ISA model HR-320) operated in Czerny-Turner configurations with different holographic gratings. The optical signal was detected by a Princeton Instruments back illuminated CCD camera model TEA-CCD-512TK with a UV/AR coating and controlled by a computer.

Figure 2:
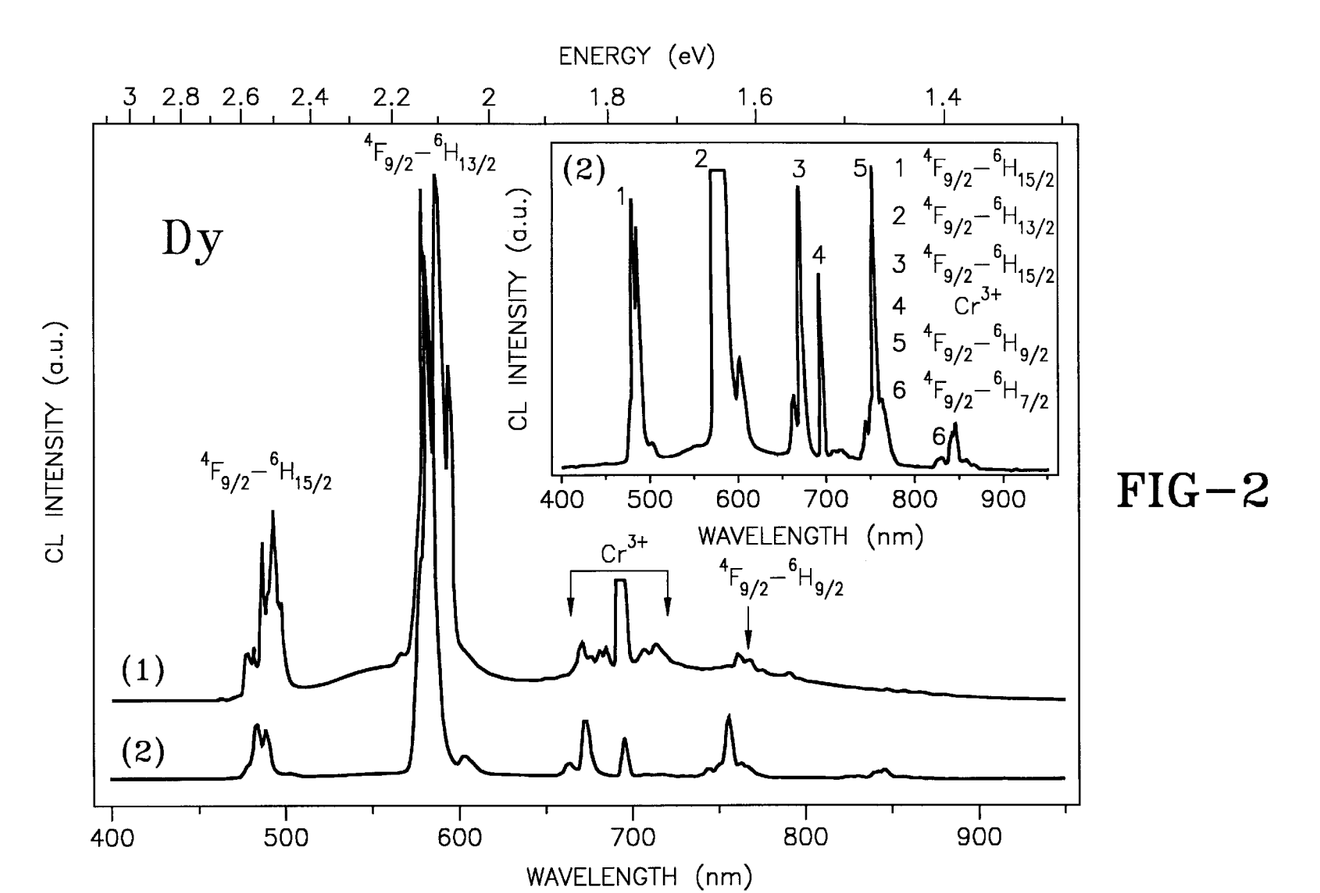
FIG. 2 is a graph of the luminescence spectra of a preferred embodiment of an Dy doped GaN structure of the present invention.
Figure 3:
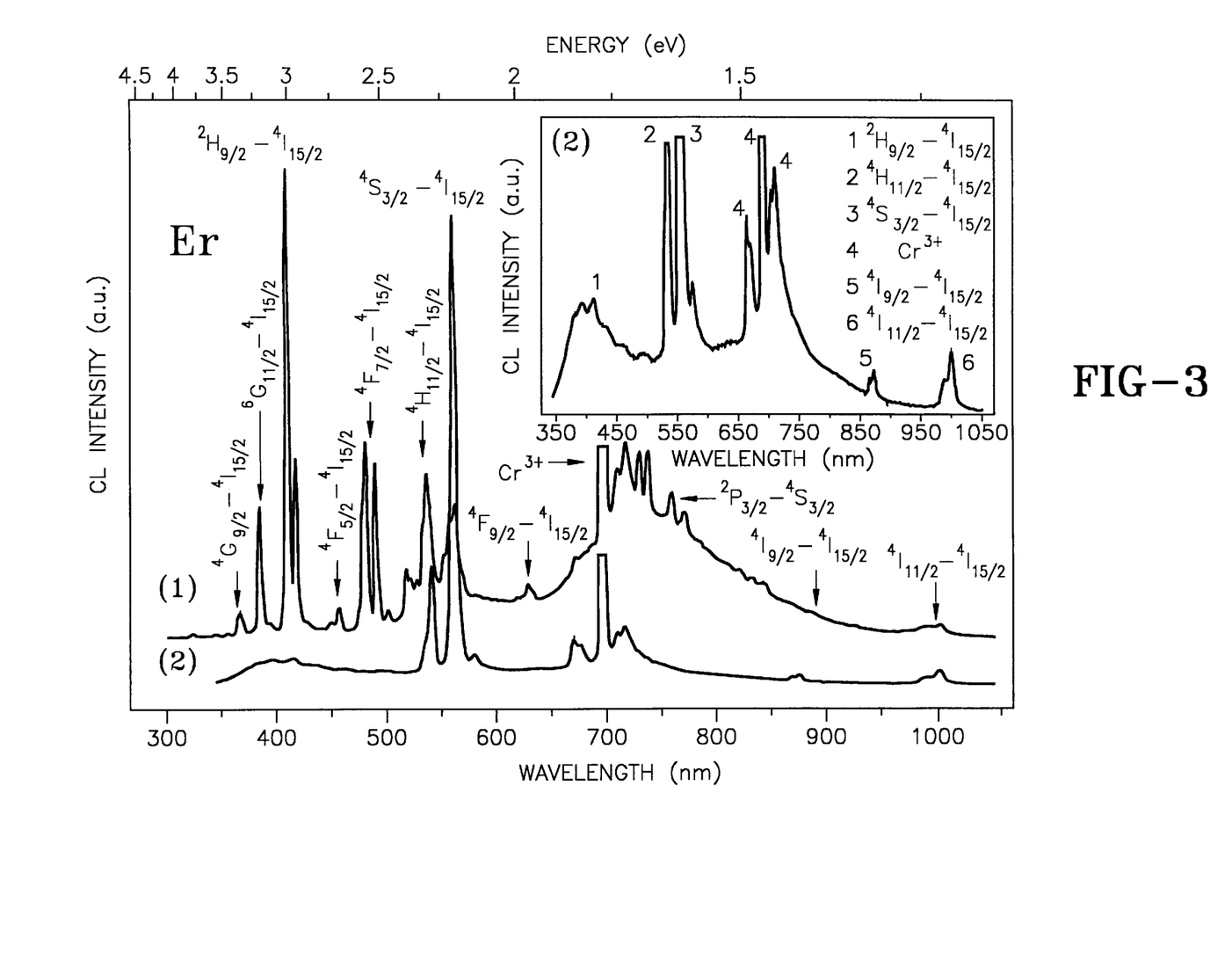
FIG. 3 is a graph of the luminescence spectra of a preferred embodiment of an Er doped GaN structure of the present invention.
Figure 4:
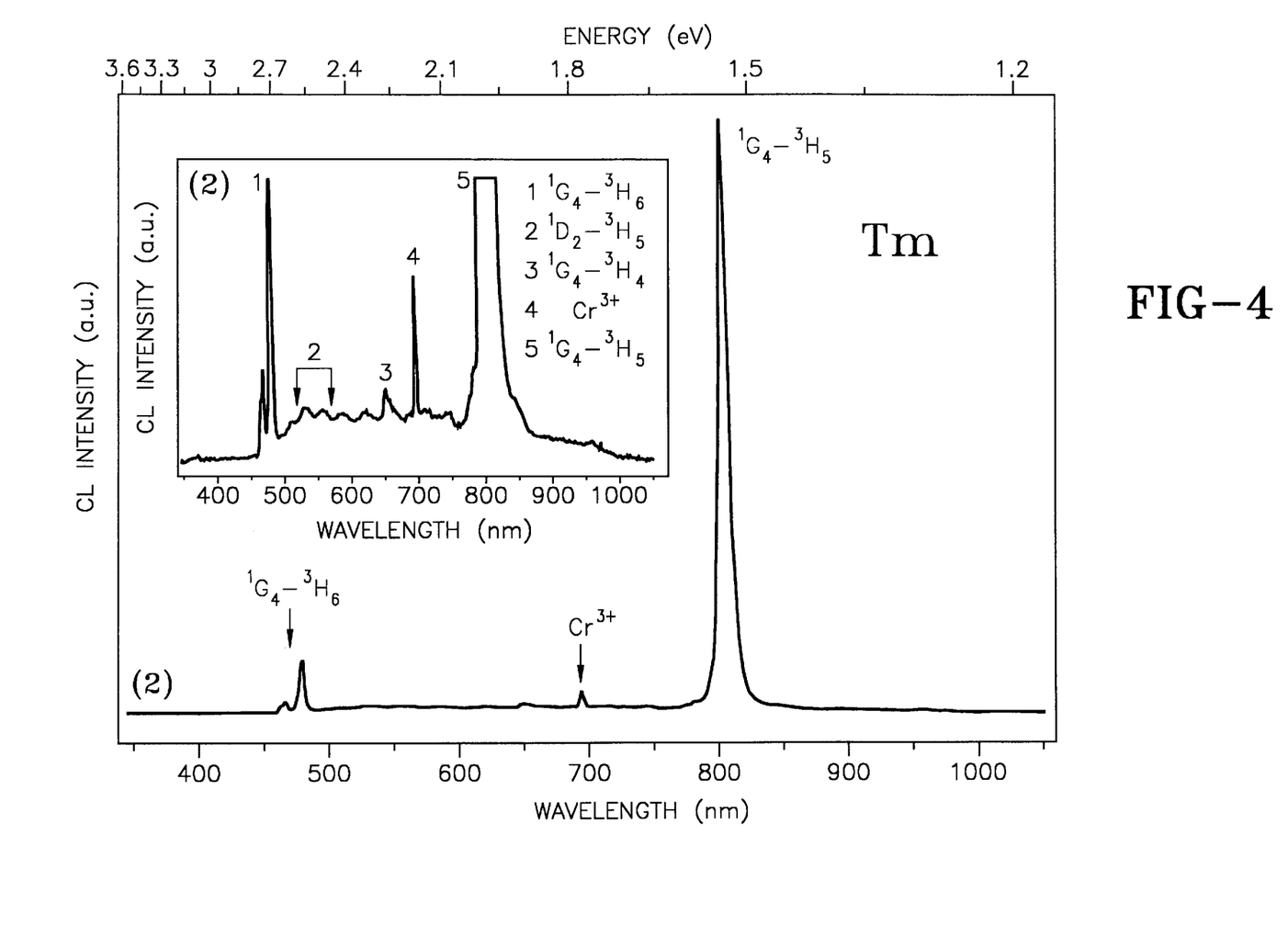
FIG. 4 is a graph of the luminescence spectra of a preferred embodiment of an Tm doped GaN structure of the present invention.

The CL spectra (shown in FIGS. 2, 3 and 4) were recorded at temperature 200 K at identical excitation conditions. FIG. 2 shows CL emission spectra of $Dy^{3+}$ implanted GaN:Si spectrum (1) and GaN spectrum (2). The assignments for most of the $RE^{3+}$ transitions have been made by comparisons with data from the literature for the trivalent RE ion(s). These results indicate that the dopant ions were optically active in the trivalent state. Some of the emission lines can be assigned to several transitions and more detailed investigation will clarify our tentative assignments. The CL spectra exhibit a large number of narrow lines as shown in an insert of FIG. 2 which is an enlargement of spectrum (2) to show the low intensity lines in the investigated spectral range of 400 nm to 950 nm. The characteristic rare earth emission line wavelengths and assignments are summarized in Table II. FIGS. 3 and 4 show in a similar manner (with exception of Tm that was only implanted into undoped GaN), the CL spectra of GaN doped with $Er^{3+}$ and $Tm^{3+}$. As was mentioned above, we implanted $RE^{3+}$ into undoped GaN and silicon doped GaN. The emission spectrum (1) in FIG. 3 of GaN:Si:Er is stronger and exhibits more sharp lines than the GaN:Er layer spectrum (2) FIG. 3. Similar behavior is shown by Dy doped GaN. The different emission spectra could possibly originate from different types of $Dy^{3+}$ and $Er^{3+}$ centers formed in the GaN and GaN:Si. The line at 694 nm that appears in all spectra is the $Cr^{3+}$ emission line originating from the sapphire substrate. Apparently, $Cr^{3+}$ trace impurities in the sapphire substrate are efficiently excited by radiative energy transfer from the rare earth emission of GaN or other excitation mechanisms. We also recorded cathodoluminescence spectra of sapphire substrate after removing GaN:Er epilayers by etching in molten KOH at 200° C. (and on the side of the sapphire substrate without GaN). The absence of a GaN layer on sapphire was confirmed by XRD analysis, which shows only the presence of $Al_2O_3$. In both cases, sapphire emission spectra showed only the $Cr^{3+}$ line at 694 nm. TABLE II Summary of $RE^{3+}$ ions line emissions at different temperatures from GaN, GaN:Si large, the nonradiative multiphonon transition rate is negligible compared to the radiative rate. This is the situation for most rare earth in nitride semiconductors. The dependency of Dy, Er, and Tm doped GaN cathodoluminescence on the temperature depends on ion and the particular 4f transitions. Generally the temperature quenching is weak, and we observe strong CL emission at 411 K (the detailed experimental data and analysis will be published elsewhere).

In conclusion, it was demonstrated, for the first time to our knowledge, that rare earth Dy, Er, and Tm ions implanted into GaN after post-implantation isochronal annealing at 1100° C. in $N_2$ or $NH_3$, at atmospheric pressure can be activated as luminescent centers emitting in the near UV, visible and infrared regions. The sharp characteristic emission lines correspond to $Dy^{3+}$, $Er^{3+}$, and $Tm^{3+}$ intra-$4f^n$-shell transitions are resolved in the spectral range from 380 nm to 1000 nm, and observed over the temperature range of 9 K–411 K. The emission spectra exhibit a weak temperature dependance that is very important for prospective optoelectronic devices operating at room or higher temperatures. The Ga sites in GaN are the most probable location for rare earth ions in GaN. The outer electron configurations of $RE^{3+}$ ions are the same $5s^2 5p^6$. If the RE ions replace Ga in GaN, which are isovalent concerning outer electrons of $RE^{3+}$ ions, they create isoelectronic traps in GaN. The above conclusion is supported by the fact that the atomic covalent radii (ionic $RE^{3+}$) for all rare earth metals are bigger than atomic radii

| $(RE)^{3+}$ ion | λ [mn] 11 K | λ [nm] 200 K | λ [nm] 411 K | Transition assignment |
|---|---|---|---|---|
| Dy |  |  | 456 | $^4I_{15/2} \rightarrow {}^6H_{15/2}$ or $^4G_{11/2} \rightarrow {}^6H_{15/2}$ |
|  | 481–497 | 483, 488, 503 | 482, 488 |  |
|  | 579–594 | 551, 581, 602 | 546, 580, 602 | $^4F_{9/2} \rightarrow {}^6H_{15/2}$ |
|  | 671, 684 | 663, 671 | 660, 670 | $^4F_{9/2} \rightarrow {}^6H_{13/2}$ |
|  | 760–767 | 743, 755, 763 | 742, 755, 767 | (can be $Cr^{3+}$) |
|  | 845–856 | 829, 845 | 827, 843 | $^4F_{9/2} \rightarrow {}^6H_{9/2}$ |
|  |  |  |  | $^4F_{9/2} \rightarrow {}^6H_{7/2}$ |
| Er | 364 |  |  | $^4G_{9/2} \rightarrow {}^4I_{15/2}$ |
|  | 383 |  | 383 | $^6G_{11/2} \rightarrow {}^4I_{15/2}$ |
|  | 409, 416 | 414 | 409 | $^2H_{9/2} \rightarrow {}^4I_{15/2}$ |
|  | 455 |  |  | $^4F_{5/2} \rightarrow {}^4I_{15/2}$ |
|  | 479, 488 |  | 478, 488 | $^4F_{7/2} \rightarrow {}^4I_{15/2}$ |
|  | 515–535 | 539 | 539 | $^2H_{11/2} \rightarrow {}^4I_{15/2}$ |
|  | 560 | 559, 578 | 560 | $^4S_{3/2} \rightarrow {}^4I_{15/2}$ |
|  | 626 | 627 | 625 | $^4F_{9/2} \rightarrow {}^4I_{15/2}$ |
|  | 757, 767 |  | 757, 768 | $^2P_{3/2} \rightarrow {}^4S_{3/2}$ |
|  | 818, 829, 839 |  | 811, 822 | $^4I_{9/2} \rightarrow {}^4I_{15/2}$ |
|  | 864–886 | 866, 873 | 872 | $^4S_{3/2} \rightarrow {}^4I_{13/2}$ or $^4I_{9/2} \rightarrow {}^4I_{15/2}$ |
|  | 984, 995 | 989, 1000 | 987, 1000 | $^4I_{11/2} \rightarrow {}^4I_{15/2}$ |
| Tm | 463, 466, 480 | 463, 466, 479 | 478 | $^1G_4 \rightarrow {}^3H_6$ |
|  | 532, 554, 583, 618 | 511, 529, 544, 585, 618 | 511, 536, 560, 592 | $^1D_2 \rightarrow {}^3H_5$ |
|  |  | 648, 654 | 648, 655 | $^1G_4 \rightarrow {}^3H_4$ or $^3F_2 \rightarrow {}^3H_6$ |
|  | 776, 790, 804, 812, 844 | 774, 781, 804, 844 | 774, 781, 804, 841 | $^1G_4 \rightarrow {}^3H_5$ |

The mechanisms of the nonradiative recombination of the excited states of a localized $RE^{3+}$ center in semiconductors are the multiphonon relaxation processes, and a migration of energy and cross relaxation processes. The probability of the multiphonon relaxation process is dependent upon the type of coupling with the lattice vibrations and the phonon frequency distribution. The results of many studies demonstrate that for ion-host lattice interactions of the $RE^{3+}$ $4f^n$ electrons, weak coupling is characteristic, and the multiphonon emission transition rates exhibit approximately exponential dependence on the energy gap to the next lowest level. If the energy gap to the next lower state is sufficiently of Ga that they are replacing, and the electronegativity of RE elements (1.1–1.25) is smaller than Ga(1.81) for which they substitute. We have evidence that the RE ion in III–V semiconductors can occupy different sites (not only substitutional). They can create more complex centers involving other impurities or native defects.

Rare earth (RE) doped semiconductors have been of considerable interest for possible application in light emitting devices and for their unique optical and electrical properties. The rare earth luminescence depends very little on the nature of the host and the ambient temperature. The 4f orbitals of rare earth ions incorporated in semiconductors are so deeply buried within the electronic shell that the energy levels of the $4f^n$ configuration are only slightly perturbed compared to free ion energy levels. The electronic structure of the RE luminescence centers and their electrical activities, as well as their indirect photo luminescence and electroluminescence excitation mechanisms are still not well understood. The systematic investigation of III–V semiconductors doped with rare earth started about two decades ago. The first study of Er doped GaN and AlN was reported by Wilson et al. The 1.54 μm photoluminescence (PL), cathodoluminescence (CL) attributed to transitions between $Er^{3+}$ $4I_{13/2}$ and $4I_{15/2}$ was observed in GaN and AlN semiconductors grown by MBE and MOCVD doped both during epitaxial growth and post growth by ion implantation. Recently, visible PL emission has been obtained from Er doped GaN grown by MBE on sapphire, and CL emission from GaN grown by MOCVD and implanted by Dy, Er and Tm over the optical range 380–1000 nm.

In this application, we report the first observation of CL of GaN implanted with Sm and Ho. Richly structured luminescence spectra attributed to trivalent rare earth ions are resolved over the wide spectral range from 380 nm to 1000 nm without or with minimal broad band emission from a GaN host. The cathodoluminescence is strong over the temperature range from 11 K to 411 K. We have reported similar behavior recently for CL emission from Dy, Er, and Tm in GaN.

The GaN material used for this investigation was grown by MOCVD on the basal plane of 2-inch diameter sapphire substrates by EMCORE and CREE. The GaN was high quality undoped n-type epilayers implanted at room temperature with Sm and Ho. The thicknesses of the epilayers, electron concentrations, and implantation conditions are shown in Table III. The implanting ion beam was inclined at 10° to the normal of the GaN epilayers to prevent channeling. The simulated depth profiles, the projected ranges and peak concentration were calculated using the Pearson distribution and shown in Table III. The samarium and holmium were implanted at three energies at fluences chosen to give an approximation of a square implant profile in the GaN epilayer. Samples were given isochronal thermal annealing treatments (duration 30 min) at temperatures from 650 up to 1150° C., in a tube furnace under the flow of $N_2$, (purity 99.999) at atmospheric pressure with flow rates of 120 cc/min using the proximity cap method to recover implantation damages and incorporate the rare earth ions as the optically active center. Only samples annealed above 1000° C. have strong visible CL spectra. The CL emission spectra presented are obtained from samples annealed at 1100° C., which seems to be the optimal annealing temperature for RE ions incorporation as the luminescent center.

TABLE III. Summary of GaN sample and implantation parameters.

| Sample implanted by ion | Initial electron concentration [$cm^{-3}$] | Thickness of film [μm] | Implanted ion energy [keV] | Doses of implanted ions [ions/$cm^2$] | Projected range [nm] | Calculated peak concentr. [$cm^{-3}$] |
|---|---|---|---|---|---|---|
| GaN: Sm | $5 \times 10^{16}$ | 1.3 | 150 | $1 \times 10^{14}$ | ~30 | $3.3 \times 10^{19}$ |
|  |  |  | 45 | $2.6 \times 10^{13}$ |  |  |
|  |  |  | 15 | $1.3 \times 10^{13}$ |  |  |
| GaN: Ho | $2 \times 10^{16}$ | 1.8 | 150 | $1 \times 10^{14}$ | ~28 | $3.8 \times 10^{19}$ |
|  |  |  | 47 | $2.8 \times 10^{13}$ |  |  |
|  |  |  | 17 | $1.5 \times 10^{13}$ |  |  |

The improved crystal quality of the GaN was visually apparent because the samples which had turned brown after the Sm and Ho implantation regained their transparent appearance following annealing. Similar observation we reported for P, As and Bi implanted into GaN, were the restored crystal quality of GaN after annealing was also confirmed by measurement of the Raman spectra.

The samples were mounted on a cold finger cooled by a closed-cycle helium cryostat operating in temperature ranges from 8.5 K to 411 K. The CL was excited by an electron beam incident upon the sample at a 45° angel from an electron gun (Electroscan EG5 VSW) which was in a common vacuum (of $\sim 5\times10^{-7}$ torr) with the cryostat (the depth of excitation can be easily varied by varying the electron acceleration voltage between 125 V and 5 kV). The emitted light was collected by a quartz lens on the entrance slit of the spectrograph-monochromator (ISA model HR-320) operated in Czerny-Turner configurations with different holographic gratings. The optical signal was detected by a Princeton Instruments back illuminated CCD camera model TEA-CCD-512TK with a UV/AR coating (spectral range 180 nm–1080 nm) and controlled by a computer.

Figure 5:
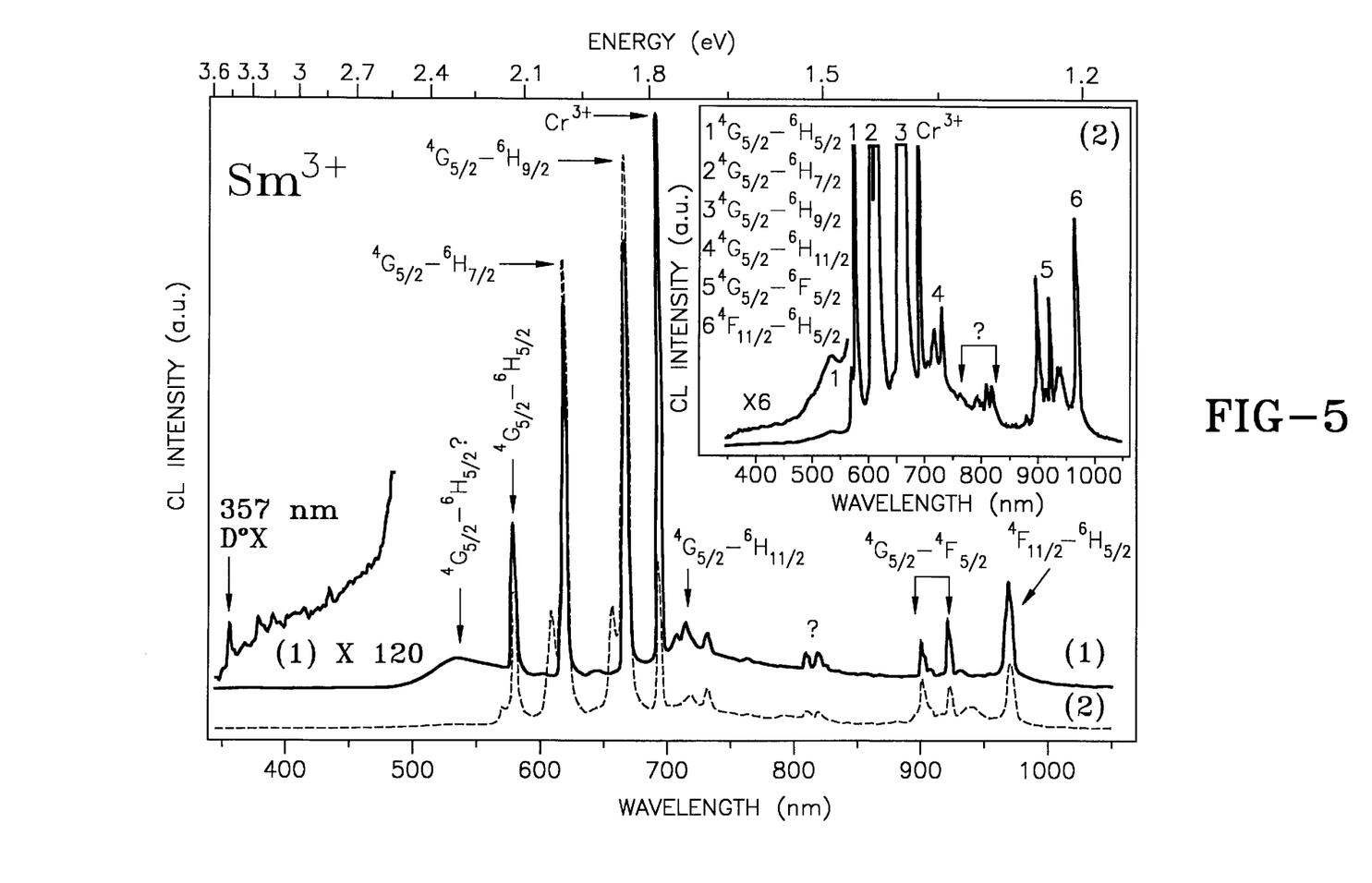
FIG. 5 is a graph of the luminescence spectra of a preferred embodiment of an Sm doped GaN structure of the present invention.
Figure 6:
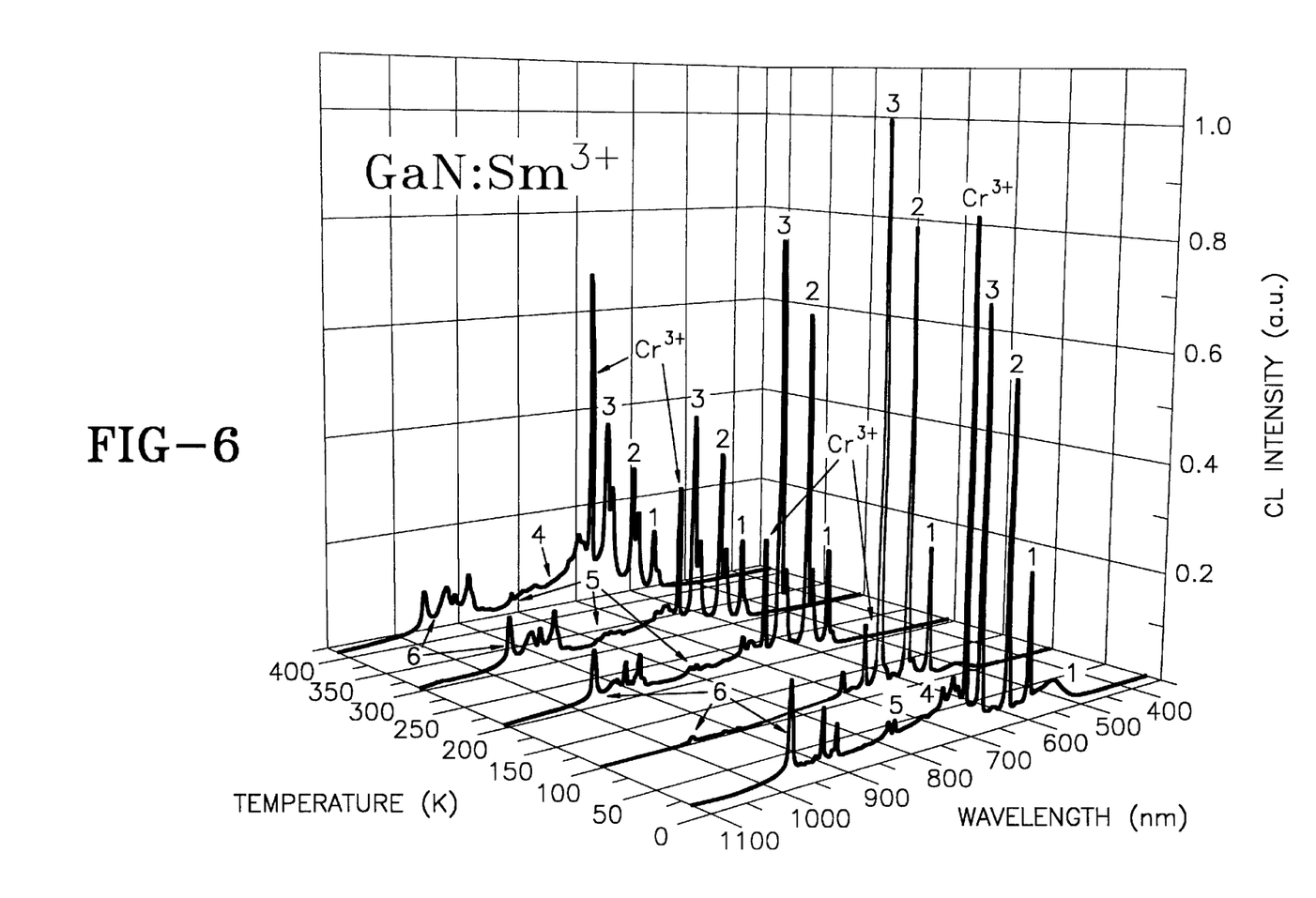
FIG. 6 is a graph of the luminescence spectra as a function of temperature of a preferred embodiment of an Sm doped GaN structure of the present invention.
Figure 7:
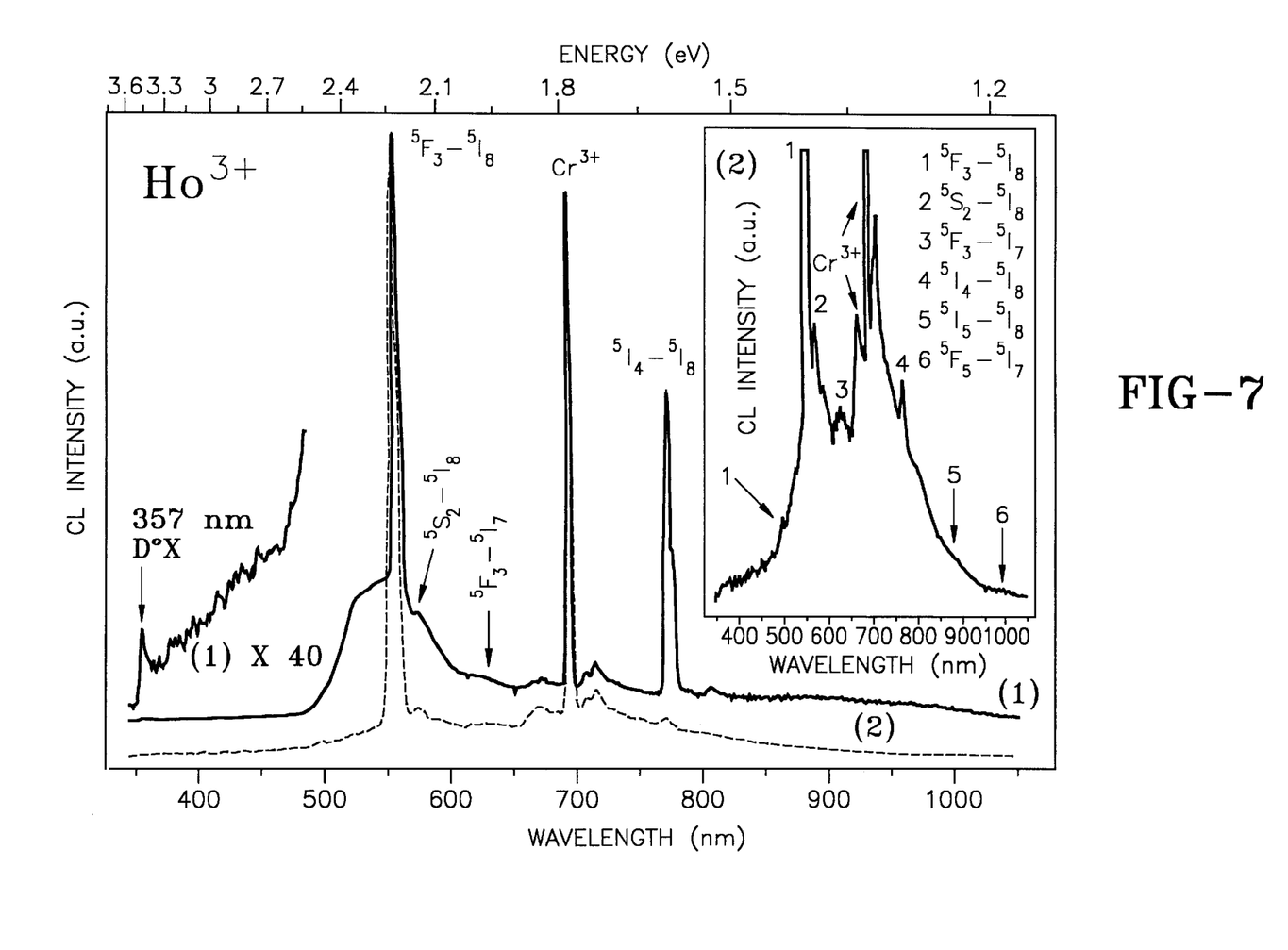
FIG. 7 is a graph of the luminescence spectra of a preferred embodiment of a Ho-doped GaN structure of the present invention.

The CL spectra shown in FIGS. 5, 6 and 7 were recorded at identical excitation conditions and different temperatures. Both CL emission spectra of $Sm^{3+}$ and $Ho^{3+}$ doped GaN at 11 K show a bound exciton to neutral donor peak at 357 nm (3.473 eV), and strong sharp emission lines attributed to the implanted rare earth. FIG. 5 shows CL emission spectra of $Sm^{3+}$ implanted GaN spectrum (1) at 11 K and spectrum (2) at 200 K. The assignments for most of the $RE^{3+}$ transitions have been made by comparisons with data from the literature for the trivalent rare earth ions. These results indicate that the dopant ions were active in the trivalent state. The characteristic rare earth emission line wavelengths is summarized in Table IV. Some of the emission lines can be assigned to several transitions and more detailed investigation will clarify our tentative assignments. The CL spectra exhibit a large number of narrow lines as shown in an insert of FIG. 5 which is an enlargement of spectrum (2) to show the low intensity lines in the investigated spectral range of 400 nm to 1000 nm.

TABLE IV

Summary of RE$^{3+}$ ions line emissions at different temperatures from GaN.

| (RE)$^{3+}$ ion | λ [nm] 11 K | λ [nm] 300 K | λ [nm] 411 K | Transition assignment | |
|---|---|---|---|---|---|
| Sm | 532, 578, 588, | 538, 570, 578, | 543, 569, 579, | $^4G_{5/2} \to {}^6H_{5/2}$ | 1. |
|  | 601, 615, 618 | 605, 615, 619 | 605, 615 | $^4G_{5/2} \to {}^6H_{7/2}$ | 2. |
|  | 643, 656, 667 | 656, 668 | 656, 668 | $^4G_{5/2} \to {}^6H_{9/2}$ | 3. |
|  | 693, 707, 714, 731 | 694, 707, 714, 731 | 694, 707, 714, 730 | Cr$^{3+}$ | |
|  | 749, 762 | 749, 762 | 749, 762 | $^4G_{5/2} \to {}^6H_{11/2}$ | |
|  | 808, 818, 825 | 791, 810, 818, 830 | 791, 811, 830, 868 | 4. | |
|  | 900, 906, 916, 921, | 880, 895, 901, 915, 923, | 880, 902, 916, 924 | ? | |
|  | 931, 944, 953, 969.7 | 935, 941, 971 | 936, 940, 972, 985 | $^4G_{5/2} {}^6F_{5/2}$ | 5. |
|  |  |  |  | $^4F_{11/2} \to {}^6H_{5/2}$ | 6. |
| Ho | 501, 526, 548, 555, | 473, 496, 553, 573, | 475, 498, 538, 552, | $^5F_3 \to {}^5I_8$ | 1. |
|  | 572, | 588 | 572, 590 | $^5S_2 \to {}^5I_8$ | 2. |
|  | 626 | 627 | 627 | $^5F_3 \to {}^5I_7$ | 3. |
|  | 664, 671 | 670 | 662, 671 | Cr$^{3+}$ | ? |
|  | 693, 707, 714, 730 | 693, 707, 714 | 694, 715 | Cr$^{3+}$ | |
|  | 771.6, 775.5, 777, | 765, 770, 776, | 762, 765, 767, 770, | $^5I_4 \to {}^5I_8$, | 4. |
|  | 805 | 805 | 772, 775, 777, 779 | or $^5S_2 \to {}^5I_7$ | |
|  | 881 | 870 |  | $^5I_5 \to {}^5I_8$ | 5. |
|  | 964 | ~990 | 914, 950, 987 | $^5F_5 \to {}^5I_7$ | 6. |

FIG. 6 shows the changes in the CL spectrum of the Sm$^{3+}$ lines with increasing temperature. Spectra were normalized by taking the 667 nm line of the 100 K spectrum as1. The intensity of this line changes slightly with temperature. FIG. 7 shows the CL spectra of GaN doped with Ho$^{3+}$. The emission spectrum (1) in FIG. 7 of GaN: Ho recorded at 11 K, is strong and exhibits two dominant sharp lines at 553 nm and 771.6 nm. The line at 553 nm overlaps on short wavelength side with a broad band which we believed contains unresolved lines with some trace of peaks at 501 nm, 526 nm, 548 nm and 572 nm on the longer wavelength side. The line at 694 nm that appears in all spectra is the Cr$^{3+}$ emission line originating from the sapphire substrate. Apparently, Cr$^{3+}$ trace impurities in the sapphire substrate are efficiently excited by radiative energy transfer from the rare earth emission of GaN. We also recorded cathodoluminescence spectra of the sapphire substrate on the side of the sapphire substrate without GaN. The sapphire emission spectra showed only the Cr$^{3+}$ line at 694 nm with accompanying weak lines on the shorter (660 nm, 673 nm) and longer (707 nm, 714 nm) wavelength sides of this line. The emission lines at the shorter wavelength side of the 694 nm Cr$^{3+}$ line overlap with very strong Sm$^{3+}$ lines appearing at 656 nm and 668 nm. From the spectra in FIG. 5 it is easy to see that these lines are the dominant ones in the samarium spectrum over a wide range of temperature.

The positions of the sharp RE ions emission lines shift less than 1 meV over the temperature range 11–400 K. The mechanisms of the nonradiative recombination of the excited states of a localized RE$^{3+}$ center in semiconductors are the multiphonon relaxation processes, cross relaxation processes and a migration of energy. Generally the temperature quenching is weak, and we observe strong CL emission at 411 K.

In conclusion, it was demonstrated, for the first time to our knowledge, that rare earth Sm and Ho ions implanted into GaN after post-implantation isochronal annealing at 1100° C. in N$_2$ or NH$_3$, at atmospheric pressure can be activated as luminescent centers emitting in the visible and near infrared regions. The sharp characteristic emission lines corresponding to Sm$^{3+}$ and Ho$^{3+}$ intra-4$f^n$-shell transitions are resolved in the spectral range from 380 nm to 1000 nm, and observed over the temperature range of 11 K–411 K. The tentative assignment of observed emission lines to RE$^{3+}$ 4$f^n$ transitions was summarized in Table IV. The emission spectra exhibit a weak temperature dependance that is very important for prospective optoelectronic devices operating at room or higher temperatures.

The newly discover optical activity of RE$^{3+}$ ions in GaN required more detailed investigations and answers to several questions. One a very important question is where the trivalent rare earth ions are incorporated in group III-nitrides AlN, GaN and InN, at substitutional sites on the metal sublattice and (or) interstitial sites. So far, we do not have experimental data on the electrical activity of RE dopants in III-nitrides semiconductors. In a hexagonal GaN crystal the Ga atoms occupy sites of symmetry C$_{3v}$, and two distinct high-symmetry interstitial positions also have C$_{3v}$ symmetry. The lattice sites of implanted radioactive $^{167}$Tm (decay to $^{167}$Er) and $^{169}$Yb (decay to $^{169}$Tm) ions were determined using the emission channeling technique. After room temperature implantation, rare earth atoms occupy relaxed Ga substitutional sites. The transition energies of Sm$^{3+}$ and Ho$^{3+}$ are well known from other host crystals and are therefore assigned to transitions (see Figures and Table IV). The levels are due to the spin-orbit coupling of the 4$f^n$ electron configurations. In C$_{3v}$ crystal symmetry the states with J=5/2, 7/2, 11/2, and 15/2 (Sm$^{3+}$) will splits to 3, 4, 6, and 8 (doublets), and state with J=0, 1, 2, 3, 4, 5, 6, 7, 8, (Ho$^{3+}$) will splits to 1, 1, 1, 3, 3, 3, 5, 5, 5, and 7 (singlet) respectively. Extraction symmetry information of RE centers from the sharp line 4$f^n$ optical spectra is difficult, because, contributions from many different centers are superimposed in the range of each inter-manifold transition. Reliable information can be obtained from Zeeman, polarization and site-selective excitation spectroscopy studies (will be published). Symmetry of center and nature of the lowest Stark level can be obtained unambiguously from ESR investigation and point-charge calculations.

We know from different investigations that Yb substituted for In in InP creates an isoelectronic trap. The Ga sites in GaN are the most probable location for rare earth ions in GaN. The outer electron configurations of RE$^{3+}$ ions are the same (5s$^2$5p$^6$). If the RE ions replace the element from column III in III-nitrides semiconductors that are isovalent concerning outer electrons of RE$^{3+}$ ions, they create isoelectronic traps in III-nitrides. The above conclusion is supported by the fact that the atomic covalent radii (ionic RE$^{3+}$) for all rare earth metals are bigger than atomic radii of Ga and Al that they are replacing. Pauling's electronegativity of RE elements(1.1–1.25) is smaller than Ga(1.81) and Al(1.61) for which it substitutes. We have evidence that the RE ion in III–V semiconductors can occupy different sites (not only substitutional). They can create more complex centers involving other impurities or native defects. The experimental data of others shows that RE ions introduce electron or hole traps in III–V semiconductors, and we do not have any evidence that RE ions act as a donor or acceptor. The rare earth isovalent traps that one might call isoelectronic "structured" impurities possess unfilled $4f^n$ core shells. It distinguishes these impurities from the "simple" impurities of main group elements of the periodic table. The "simple" impurity typically introduces only effective-mass-like states in the forbidden gap of the host crystals. The presence of low lying empty core orbitals in rare earth "structured" impurities introduces new excitation and recombination phenomena. The luminescence structure arises from intra-configurational $4f$—$4f$ transition in the core of the isoelectronic "structured" impurities. The knowledge about the microscopic structure of RE centers in III-nitrides is crucial for understanding the excitation processes of $4f$—$4f$ transitions which in turn can determined the future of the RE dopants in optoelectronic applications.

Excitation mechanism in cathodoluminescence involve direct impact excitation of rare earth ions (RE$^{3+}$) by hot electrons, as well as by energy transfer from electron-hole pairs generated in GaN crystal to the $4f^n$ electron system. The direct impact excitation mechanism of RE$^{3+}$ ions in semiconductors, the new step impact electroluminescent device (SIED), and a step photon amplifier converter (SPAC) have been described. The second process most probably involve the RE related "structured" isoelectronic center. The isoelectronic trap can be the electron or hole trap. Since there is no charge involved, the isoelectronic center forms the bound states by a short range central-cell potential. After an isoelectronic trap has captured an electron or a hole, the isoelectronic trap is negatively or positively charged, and by Coulomb interaction it will capture a carrier of the opposite charge creating a bound exciton. There are three possible mechanisms of energy transfer. The first is the energy transfer process from excitons bound to "structured" isoelectronic centers to the core electrons. It takes place as a result of the electrostatic perturbation between the core electrons of the "structured" impurity and the exciton, effective-mass-like particles. The second mechanism is the transfer of energy to the core electrons, involving the "structured" isoelectronic trap occupied by electron (hole) and free hole (electron) in the valence (conduction) band. The third mechanism is the transfer through an inelastic scattering process in which the energy of a free exciton near a "structured" trap is given to the localized core excited states. If the initial and final states are not resonant, the energy mismatch must be distributed in some way, e.g. by phonon emission or absorption. If the atomic core excitations are strongly coupled to the host phonons, the energy transfer probability is likely to be higher. Strong phonon coupling may also be desirable in ensuring that relaxation down the ladder of the core excited states occurs quickly, thus preventing back transfer. However, for efficient radiative recombination, the phonon coupling should not be strong, in order to prevent core de-excitation by nonradiative multiphonon emission. In this regard the rare earth "structured" impurity seems to be ideal.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A structure comprising:
   a gallium nitride semiconductor crystal, said gallium nitride semiconductor crystal having a dopant of at least one rare earth ion;
   wherein said structure has been annealed at a temperature of at least about 1,000 degrees Celsius.

2. The structure of claim 1 wherein the gallium nitride is grown by MBE or MOCVD.

3. The structure of claim 2 wherein the gallium nitride is doped with said at least one rare earth ion during its growth process.

4. The structure of claim 2 wherein said at least one rare earth ion is implanted in the gallium nitride.

5. The structure of claim 4 wherein damage to said gallium nitride semiconductor crystal caused by the implantation of said at least one rare earth ion is substantially repaired by the annealing.

6. The structure of claim 1 wherein said structure is adapted to provide a luminescence spectra over the range from about 380 nanometers to about 1000 nanometers when excited by a suitable excitation.

7. The structure of claim 1 wherein said gallium nitride semiconductor crystal is doped with a beam of rare earth ions that are inclined at about 10 degrees to the normal of the epilayers of said gallium nitride semiconductor crystal.

8. The structure of claim 1 wherein the gallium nitride is n-type undoped.

9. The structure of claim 1 wherein said gallium nitride semiconductor crystal is also silicon-doped.

10. The structure of claim 1 wherein said structure was annealed under a flow of $N_2$ or $NH_3$.

11. The structure of claim 1 wherein said at least one rare earth ion is Nd$^{3+}$, Sm$^{3+}$, Dy$^{3+}$, Ho$^{3+}$, Er$^{3+}$, or Tm$^3$+.

12. A structure adapted to provide a luminescence spectra over the spectral range from about 380 nanometers to about 1000 nanometers when excited by a suitable excitation, said structure comprising:
   a gallium nitride semiconductor crystal, said gallium nitride semiconductor crystal having a dopant of at least one rare earth ion;
   wherein said structure has undergone isochronal thermal annealing treatment at a temperature of at least about 1,000 degrees Celsius.

13. The structure of claim 12 wherein the gallium nitride is grown by MBE or MOCVD.

14. The structure of claim 13 wherein the gallium nitride is doped with said at least one rare earth ion during its growth process.

15. The structure of claim 13 wherein said at least one rare earth ion is implanted in the gallium nitride.

16. The structure of claim 15 wherein damage to said gallium nitride semiconductor crystal caused by the implantation of said at least one rare earth ion is substantially repaired by the annealing.

17. The structure of claim 12 wherein the isochronal thermal annealing treatment was performed under a flow of $N_2$ or $NH_3$.

18. The structure of claim 12 wherein said gallium nitride semiconductor crystal is doped with a beam of rare earth ions that are inclined at about 10 degrees to the normal of the epilayers of said gallium nitride semiconductor crystal.

19. The structure of claim 12 wherein the gallium nitride is n-type undoped.

20. The structure of claim 12 wherein said gallium nitride semiconductor crystal is also silicon-doped.

21. The structure of claim 12 wherein said at least one rare earth ion is $Nd^{3+}$, $Sm^{3+}$, $Dy^{3+}$, $Ho^{3+}$, $Er^{3+}$, or $Tm^{3+}$.

* * * * *

UNITED STATES PATENT AND TRADEMARK OFFICE
CERTIFICATE OF CORRECTION

PATENT NO. : 6,140,669
DATED : October 31, 2000
INVENTOR(S) : Lozykowski et al.

It is certified that error appears in the above-identified patent and that said Letters Patent is hereby corrected as shown below:

<u>Column 1,</u>
Line 5, please insert the following heading and paragraph.
-- Government License Rights
The U.S. Government has a paid-up license in this invention and the right in limited circumstances to require the patent owner to license others on reasonable terms as provided for by the terms of Contract No._N00014-96-1-0782, awarded by Office of Naval Research. --

Signed and Sealed this

Seventh Day of May, 2002

Attest:

*Attesting Officer*

JAMES E. ROGAN
*Director of the United States Patent and Trademark Office*